D. C. MULVIHILL.
MINE CAR.
APPLICATION FILED DEC. 20, 1920.

1,408,767.

Patented Mar. 7, 1922.
2 SHEETS—SHEET 1.

Inventor:
Daniel C. Mulvihill
By *[signature]*
Attys.

D. C. MULVIHILL.
MINE CAR.
APPLICATION FILED DEC. 20, 1920.

1,408,767.

Patented Mar. 7, 1922.
2 SHEETS—SHEET 2.

Inventor:
Daniel C. Mulvihill
By Gibson & Feller
Attys.

UNITED STATES PATENT OFFICE.

DANIEL C. MULVIHILL, OF HANNIBAL, MISSOURI.

MINE CAR.

1,408,767. Specification of Letters Patent. Patented Mar. 7, 1922.

Application filed December 20, 1920. Serial No. 432,083.

*To all whom it may concern:*

Be it known that I, DANIEL C. MULVIHILL, a citizen of the United States, and resident of Hannibal, county of Marion, and State of Missouri, have invented certain new and useful Improvements in Mine Cars, of which the following is a specification and which are illustrated in the accompanying drawings, forming a part thereof.

The invention relates to mine cars, and has as an object the provision of an improved journal bearing for such cars.

The bearings for mine cars heretofore known, which are provided with ball or roller bearings, have been too complicated for the exceedingly heavy and rough usage to which such vehicles are subjected. The roller races of such bearings have, moreover, been commonly made of cast iron, or other material without good wearing qualities, and there has been no practicable process for chilling the metal of which the races were cast. By the present invention it is possible to chill these parts to insure long life therein.

Figure 1:
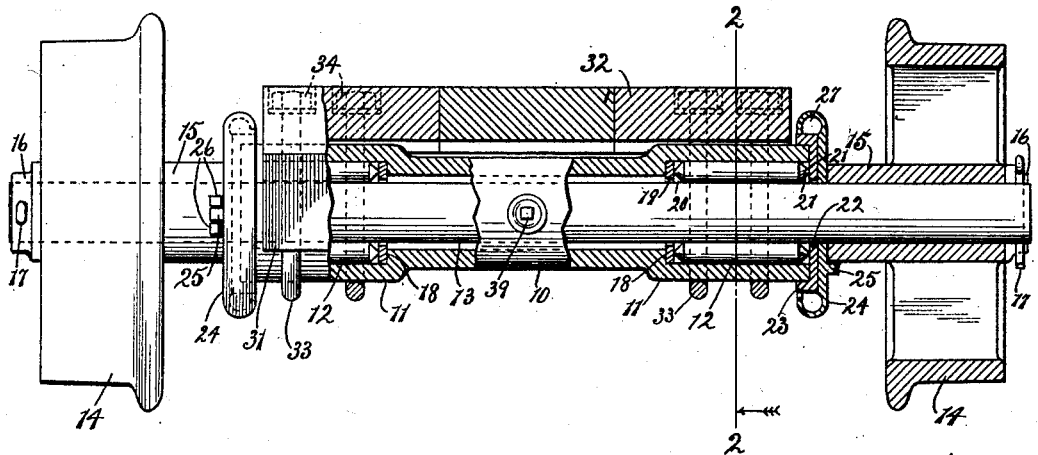
Fig. 1 is an end view, partly in section, of a mine car showing its axle and bearing construction.
Figure 2:
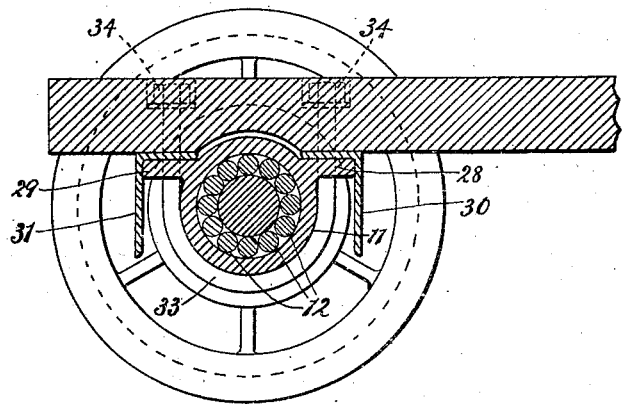
Fig. 2 is a detail section on the line 2—2 of Fig. 1.
Figure 3:
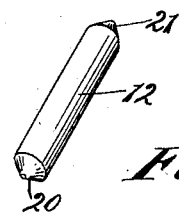
Fig. 3 is a perspective view of a bearing roller.

An axle housing is shown at 10, which has enlarged end portions 11, forming races for the reception of rollers 12 to reduce friction upon the axle 13. The wheels 14, having hubs 15 integral therewith, are each retained on the axle by means of a cap 16, having a cotter pin 17 passed through the cap and through the axle.

The interior of the enlarged end 11 of the axle housing is formed with the shoulder 18, against which the hardened washer 19 is placed, to receive the end thrust of the rollers 12. To reduce the friction of such thrust the rollers are pointed at both ends, as at 20, 21. In the form shown in Fig. 1, the end thrust of the outer end of the rollers 12 is taken by an annular disk 22, provided with an angular flange enclosing the end of the axle housing.

To prevent wear between the end of the hub 15 and the annular disk 22, a second disk 24 is provided, which disk is constrained to revolve with the hub by means of a lug 25 carried by the disk, which lug projects between two lugs 26 carried by the hub 15. For preventing access of dust to the bearing the edge of the annular disk 24 may be turned, as shown at 27, to partially enclose the flange 23.

Flanges 28, 29, may be cast on the enlarged portions 11 of the axle housing, and angle bars 30, 31, may be supported thereon to carry the platform 32. To retain the platform and angle bars in position, stirrups 33 are shown passing through the flanges 28, 29, through the angle bars 30, 31, and through the platform, and secured by nuts 34 preferably sunk flush with the surface of the platform. An oil opening in the housing may be provided and closed by a screw plug, as 39.

Figure 4:
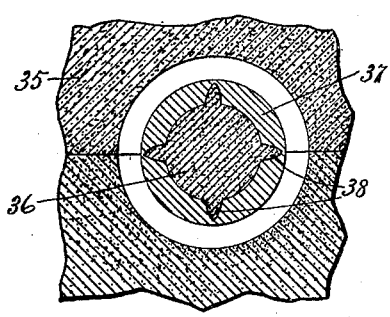
Fig. 4 is a transverse section on the line 4—4 of Fig. 5.
Figure 5:
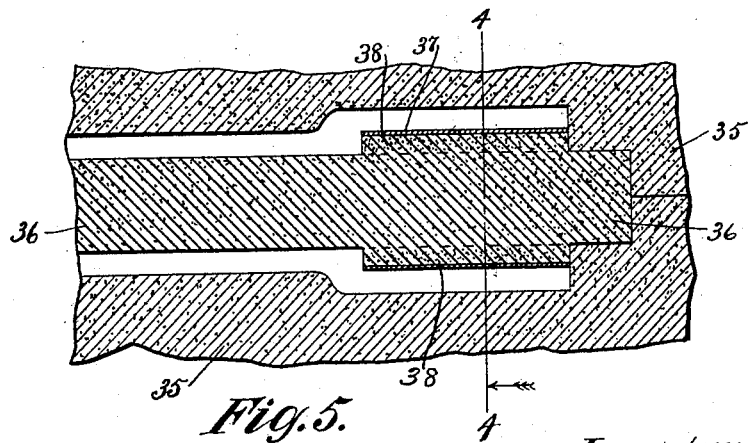
Fig. 5 is a detail central longitudinal section through a mold for casting an axle housing.

Devices of this nature heretofore formed of cast iron have had a short life, since it has not been found practicable to harden the metal. To remove this defect the present invention provides a process which is carried out as illustrated in Figs. 4 and 5. In these figures there is shown the sand 35 of a fragment of a mold for casting an axle housing, and at 36 the core for forming the passage through the housing. A chill 37 is shown surrounding the core 36 in the portion of the mold which is to form the enlarged end portion 11 of the housing. The chill must be destroyed in order to remove it after the casting has been poured. To make it possible to break the chill out without injury to the casting interior grooves 38 are provided in the chill. Under these circumstances it is possible to place a tool against the end of the sections of the chill and strike it a heavy blow, and thereby to fracture the chill on the lines of weakness and remove the sections from the completed casting.

Figure 6:
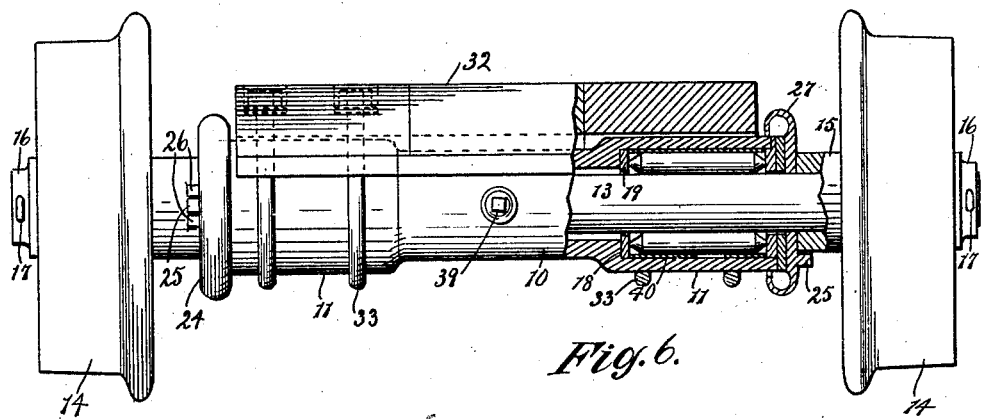
Fig. 6 is an end view, partly in section, of a mine car showing a modified form of bearing.
Figure 7:
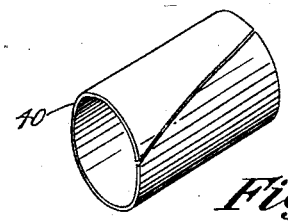
Fig. 7 is a perspective view of a bushing.

In the form of Figs. 6 and 7, a hardened race for each set of rollers is provided in the form of a bushing 40. As shown, this bushing is formed from a flat sheet of material rolled into a cylinder. To prevent the crushing of the material at the edges of the joint by pressure of the rollers the joint is formed diagonally on the blank so as to assume a spiral form on the surface of the completed bushing. In the event of injury to a bushing or wear thereof, it may be renewed and a new one substituted.

Many minor changes may be made in the physical embodiment of the invention without departing from its spirit.

I claim as my invention—

1. A mine car comprising, in combination, an axle housing, horizontal flanges carried by said housing, angle members supported on said flanges, a platform supported on said angles, and stirrups passing around the axle housing and through the flanges, angles and platform for securing said parts together.

2. A mine car comprising, in combination, an axle housing, enlarged end portions on said housing interiorly providing roller races, an axle in said housing, rollers about said axle coacting with said races, an annular disk surrounding said axle closing said races to retain the rollers, a peripheral flange on said disk surrounding the end of said housing, a wheel having a hub mounted on said axle, and an annular disk surrounding said axle and arranged between said hub and said first-named disk.

3. A mine car comprising, in combination, an axle housing, enlarged end portions on said housing interiorly providing roller races, an axle in said housing, rollers about said axle coacting with said races, an annular disk surrounding said axle closing said races to retain the rollers, a wheel having a hub mounted on said axle, an annular disk surrounding said axle and arranged between said hub and said first-named disk, means to cause said second-named disk to revolve with the hub, the edge of said second-named disk dished out of its plane to substantially enclose the edges of said first-named disk for exclusion of dust.

4. A mine car comprising, in combination, a cast metal axle housing, races for roller bearings formed in the ends of said housing, the metal of said housing about said races being hardened by chilling during its casting.

5. In a mine car, in combination, a cast metal axle housing having its interior hardened to form a bearing surface, and bearing rollers running directly on such hardened surface.

DANIEL C. MULVIHILL.